United States Patent
Mayerhofer

[11] Patent Number: 5,604,962
[45] Date of Patent: Feb. 25, 1997

[54] ZIPPER SLIDE

[76] Inventor: Friedrich Mayerhofer, Rolliweg 15, CH- 2543 Lengnau, Switzerland

[21] Appl. No.: 516,932

[22] Filed: Aug. 18, 1995

Related U.S. Application Data

[63] Continuation of Ser. No. 172,193, Dec. 23, 1993, abandoned.

[30] Foreign Application Priority Data

Dec. 29, 1992 [EP] European Pat. Off. ............. 92811027

[51] Int. Cl.⁶ ........................................ A44B 19/30
[52] U.S. Cl. ........................................ 24/421
[58] Field of Search ........................ 24/387, 415, 420, 24/421, 418, 429

[56] References Cited

U.S. PATENT DOCUMENTS

| | | | |
|---|---|---|---|
| 1,890,336 | 12/1932 | Nodine | 24/418 |
| 2,274,161 | 2/1942 | Poux | 24/415 |
| 2,509,278 | 5/1950 | Scheuermann et al. | |
| 2,736,062 | 2/1956 | Scheuermann et al. | |
| 3,419,943 | 1/1969 | Heinberger | 24/421 |
| 4,210,196 | 7/1980 | Weiner | |
| 5,054,183 | 10/1991 | Mayerhofer | |
| 5,073,103 | 12/1991 | Liao | |
| 5,079,820 | 1/1992 | Mayerhofer | |

FOREIGN PATENT DOCUMENTS

| | | | |
|---|---|---|---|
| 4139480 | 6/1993 | Germany | |
| 412440 | 11/1966 | Switzerland | 24/429 |
| 1370005 | 10/1974 | United Kingdom | |

*Primary Examiner*—James R. Brittain
*Attorney, Agent, or Firm*—Richard Linn

[57] ABSTRACT

A zip-fastener slide with pull tab can be manufactured in one single injection step. For this purpose the opening beneath the bow on the slide body, serving to secure the pull tab, is fashioned by four movable mould cores. The four mould cores are shifted into the mould before injection, and withdrawn in order to eject the finished slide again from the mould. Similarly it is also possible to provide a locking cam which, when in the inoperative position, projects into the intermediate space between two zipper links and blocks the movement of the slide. By means of pulling on the pull tab, the locking cam can be withdrawn from this intermediate space, and the slide can be released.

12 Claims, 7 Drawing Sheets

ZIPPER SLIDE

This application is a continuation of application Ser. No. 08/172,193, filed Dec. 23, 1993, abandoned.

The present invention relates to a method for manufacturing zipper slides, especially by injection moulding, in which the pull tab of the zipper slide is injection-moulded together with the slide body.

BACKGROUND OF THE INVENTION

A method of injection-moulding a zipper slide with pull tab is described in European Patent No. 0 282 987. According to this Patent document, the slide body is injection-moulded in a first injection step. The bow on the slide body, which later receives the pull tab, is formed by an inserted mould core with a displaceable auxiliary core lying therein. The auxiliary core is withdrawn in order to injection mould the pull tab. Thus there results an injection duct which passes through underneath the bow of the slide body. Thereafter the injection mass for the pull tab is injected. The mould core is then again withdrawn from the mould, before ejection of the completed zipper slide with pull tab.

A disadvantage of this method is that the injection procedure is effected in two steps. In addition, before injecting the pull tab there must be a delay until the material of the slide body has hardened sufficiently so that the material of the pull tab does not combine with that of the body, as the injected material for the pull tab comes into direct contact with that of the slide body.

A purpose of the present invention is to indicate a method by means of which the zipper slide body and the pull tab may be manufactured in one single injection step. Such a method is indicated in claim 1. The further claims define preferred embodiments, tools for carrying out the method and zipper slides produced thereby.

SUMMARY OF THE INVENTION

Accordingly, four mould cores are inserted in an approximately cruciform configuration into a mould, until they are in contact with one another. The abutting surfaces are in this case so shaped that in particular they form the bow produced on the slide body, as well as the cross web of the pull tab which passes through between bow and slide body. In a preferred embodiment, two of the mould cores have in addition projections which separate the connection between the end of the bow and the slide body. In this way there is obtained a rear portion of the slide body which is resiliently connected with the rest of the slide body only by the bow. Integrally moulded on this portion there can be a cam which projects into the intermediate space between the links of the zipper strip. Thus a self-locking zipper slide is obtained. The locking action is removed when the pull tab is pulled forward or backward, the bow is bent upward by a wedge action, and the cam is withdrawn from the zipper strip.

The invention will be explained in more detail with reference to an embodiment given by way of example and illustrated by means of drawings.

DETAILED DESCRIPTION OF THE INVENTION

Figure 1:
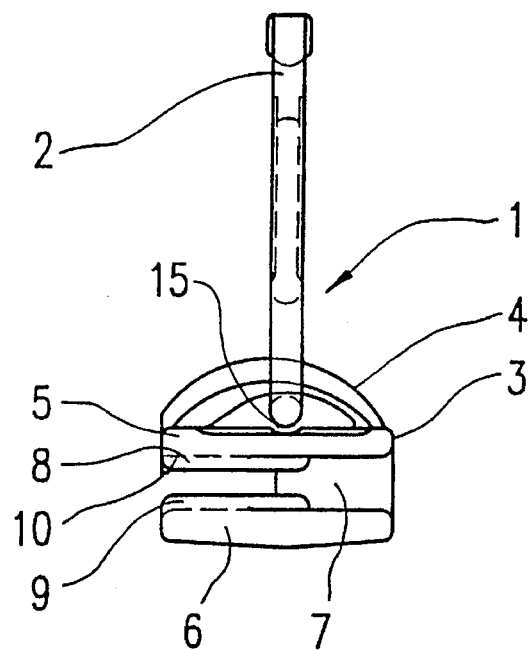
FIG. 1: shows a side elevation of a zipper slide manufactured by the method according to the invention.

FIG. 1 shows a zipper slide 1 manufactured according to the invention with a pull tab 2 and a slide body 3. The bow 4 spans the slide body 3 and serves as an attachment for the pull tab 2. The body 3 comprises the upper plate 5 and the lower plate 6, which are connected by the separating wedge 7. The separating wedge 7, together with lateral guides 8 or 9 of the upper base plate 5 or of lower base plate 6, serves in a known way to guide the link strips during opening or closing of the zip fastener.

The upper plate 5 and the lower plate 6 each have first and second ends and the separating wedge 7 connects the first ends of said upper and lower plates and forms therewith a pair of guide channels for the respective coupling elements of a zip fastener merging at a narrow mouth of the slider body remote from said separating wedge 7.

The bow is resiliently deflectable and surmounts said upper plate, extending in a longitudinal direction of said slider from the first end to the second end of said upper plate, the bow member having first and second ends, said first end of said bow being anchored to said body at said first end of said upper plate, and the second end of said bow member terminating at said mouth.

The pull tab 2 is movably secured within an eye formed between said upper plate and said bow. The locking cam 10 is connected with and forms an extension of the second end of said bow and is projectable into said the channels at said mouth for engagement with coupling elements of the zip fastener to lock the slider thereto. The locking cam 10 is withdrawable from engagement with the coupling elements upon deflection of the second end of said bow member away from the body.

A first stop portion is formed on the second end of said upper plate and a second stop portion is formed on said second end of said bow and is disposed in spaced relation with the first stop portion of said upper plate when the bow is in a relaxed condition. The second stop portion is engageable with the first stop portion to limit deflection of the bow away from the body. The first and second stop portions are interengageable steps.

Figure 2:
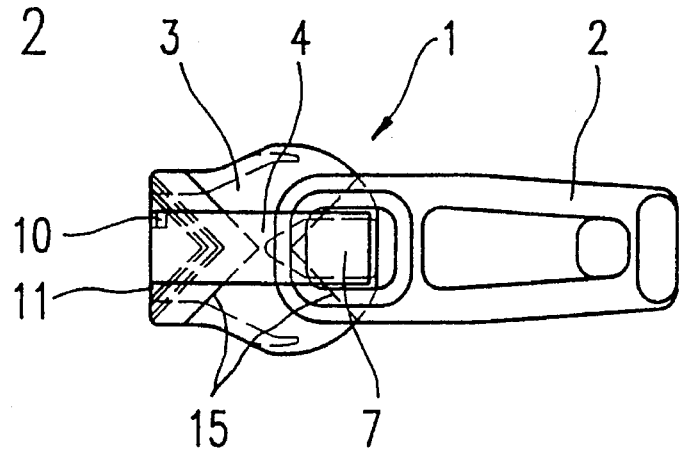
FIG. 2: a view from above of the slide, with the pull tab swung forward.

As evidenced by FIG. 2, the first stop portion and the second stop portion each have surface cross sections which are uniform along an axis oriented at an angle with respect to said longitudinal direction of said slider. In this arrangement, the slider body, the bow, the pull tab, the locking cam, the first stop portion, and the second stop portion may be unitarily molded from plastic material. As further seen in FIG. 2, the first and second stop portions each have two sections, one on each side of a centerline in said longitudinal direction. These two sections form a "V" shape.

Figure 3:
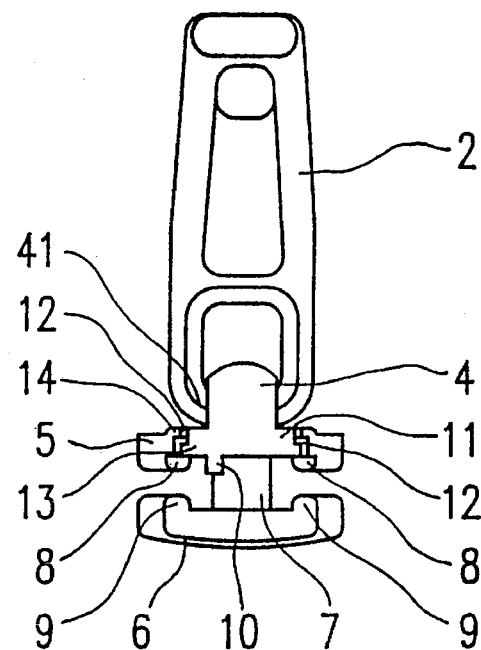
FIG. 3: a view of the slide from behind.

The locking cam 10, as FIGS. 2 and 3 show, is integrally moulded on a wedge-shaped portion 11 of the upper plate 5. The portion 11 is separated from the rest of the base plate 5 by a slot 12, and is therefore connected to the slide body 3 only by the bow 4. The slot 12 is preferably step-shaped in design so that, when a pull is exerted on the pull tab 2, and the portion 11 is moved upward via the bow 4, the projection 13 of portion 11 contacts the projection 14 on the upper base plate 5, and thus the upward movement is stopped. In this position the locking cam 10 is withdrawn out of intermediate space between the zip links, and the slide 1 can be drawn away over the zip fastener strips, whereas in the inoperative position, i.e. without traction on the pull tab 2, the locking cam 10 protrudes into the intermediate space between two zip links, and thus blocks the movement of the slide 1.

In addition, the lateral guides as shown in FIG. 2 can be formed in the so-called "wing-lock" structure. The ends of the lateral guides 8 and 9 passed to the separating wedge 7 can engage in hooked fashion in the rear ends of the zip links, thus relieving the locking cam 10 of loading.

In addition, a recess 15 is advantageously formed in the upper base plate 5. The pull tab 2 must then be pulled away with a certain expenditure of effort over the edges of the recess 15, in order to unlock the slide.

Figure 9:
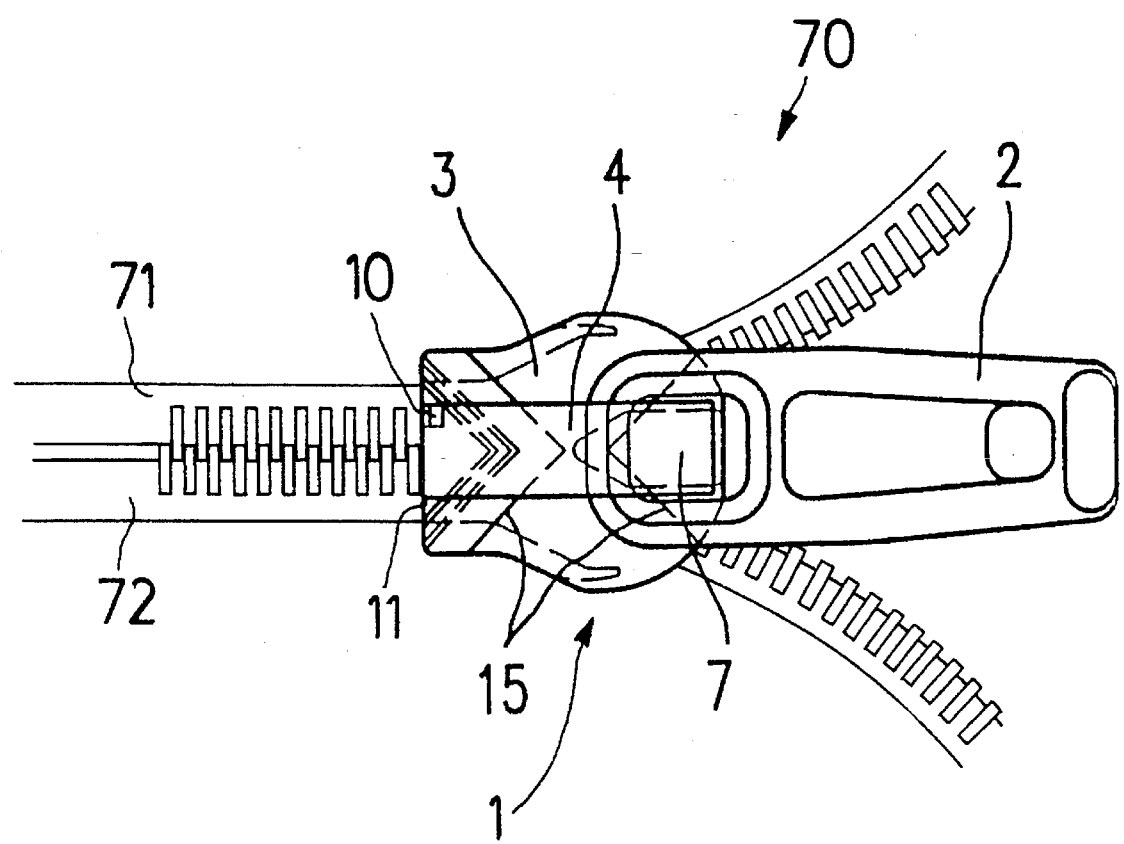
FIG. 9: a view from above of a slide fastener arrangement including the slide.

FIG. 9 shows the slide engaged in a slide fastener arrangement. The slide fastener 70 has a pair of coupling elements, 71 and 72, along respective slide fastener halves. The coupling elements are interconnectable upon movement of the slide along the coupling elements in a fastener-closing direction and adapted to disengage the coupling elements upon movement of the slide in an opposite fastener-opening direction.

Figure 4:
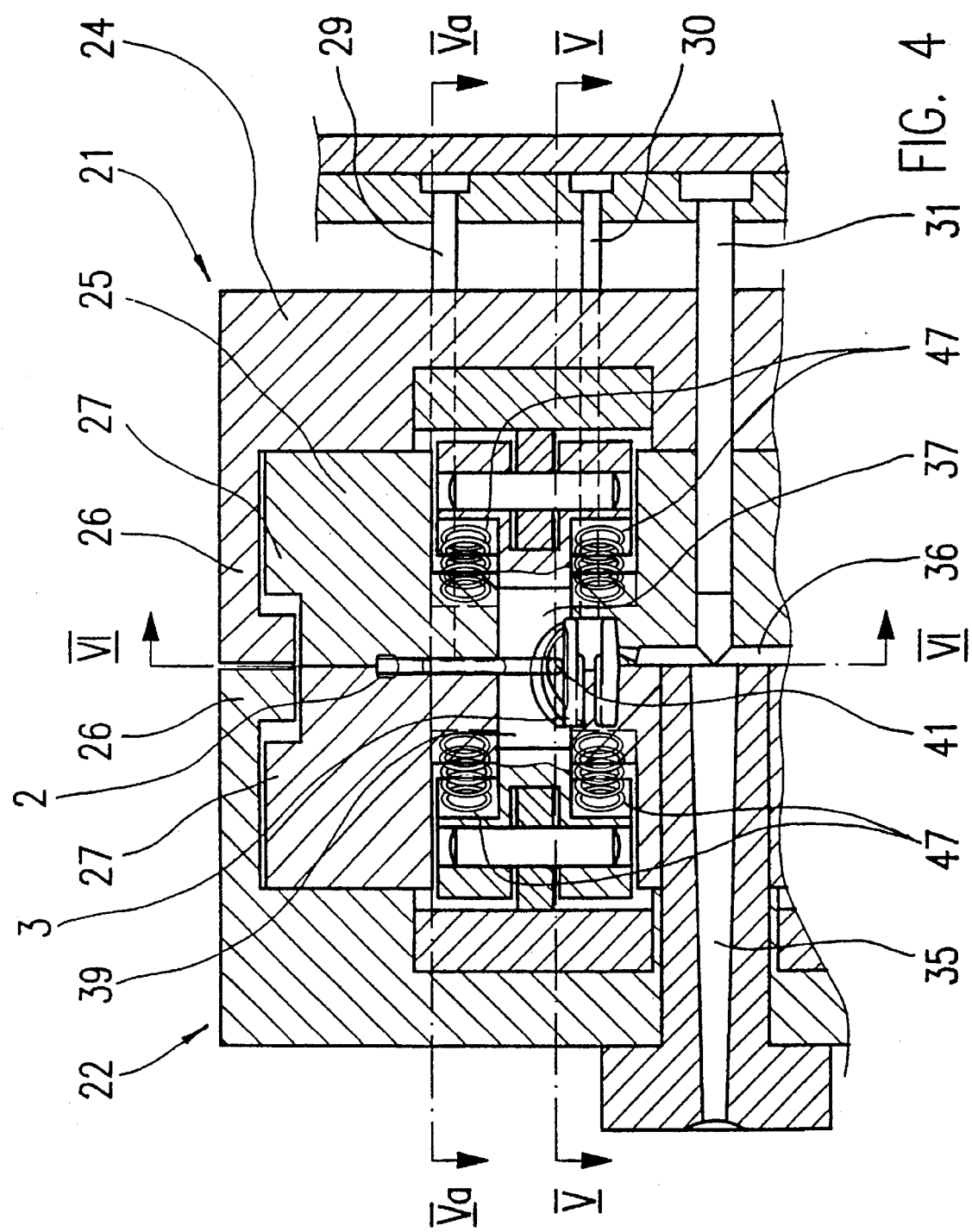
FIG. 4: a cross-section through an injection mould with the devices essential to the invention, a partial elevation of the actuating members for the mould cores and a side elevation of a zipper slide formed therein.

FIG. 4 shows a cross-section through a tool for manufacturing the zip fastener slide 1. It comprises the forward half 21 of the tool and the rearward half 22 of the tool. The forward half 21 of the tool comprises the actuating plate 24 and the matrix 25. The actuating plate 24 also has claws 26, which engage with a degree of play behind projections 27 on the matrix 25. This arrangement acts as a limiting means for a relative movement of the matrix with respect to the actuating plate 24.

By means of the actuating plate 24 and the matrix 25, the ejectors 29, 30 and 31 for the pull tab, the body or the sprue are caused to project.

The rearward tool 22 is substantially a mirror image of the forward tool 21. Instead of the ejectors 29 to 31, however, the sprue duct 33 extends through the actuating plate 34 and the matrix 35 to the duct 36 which feeds the injected material to the moulds for the zip fastener slide 1.

Figure 5:
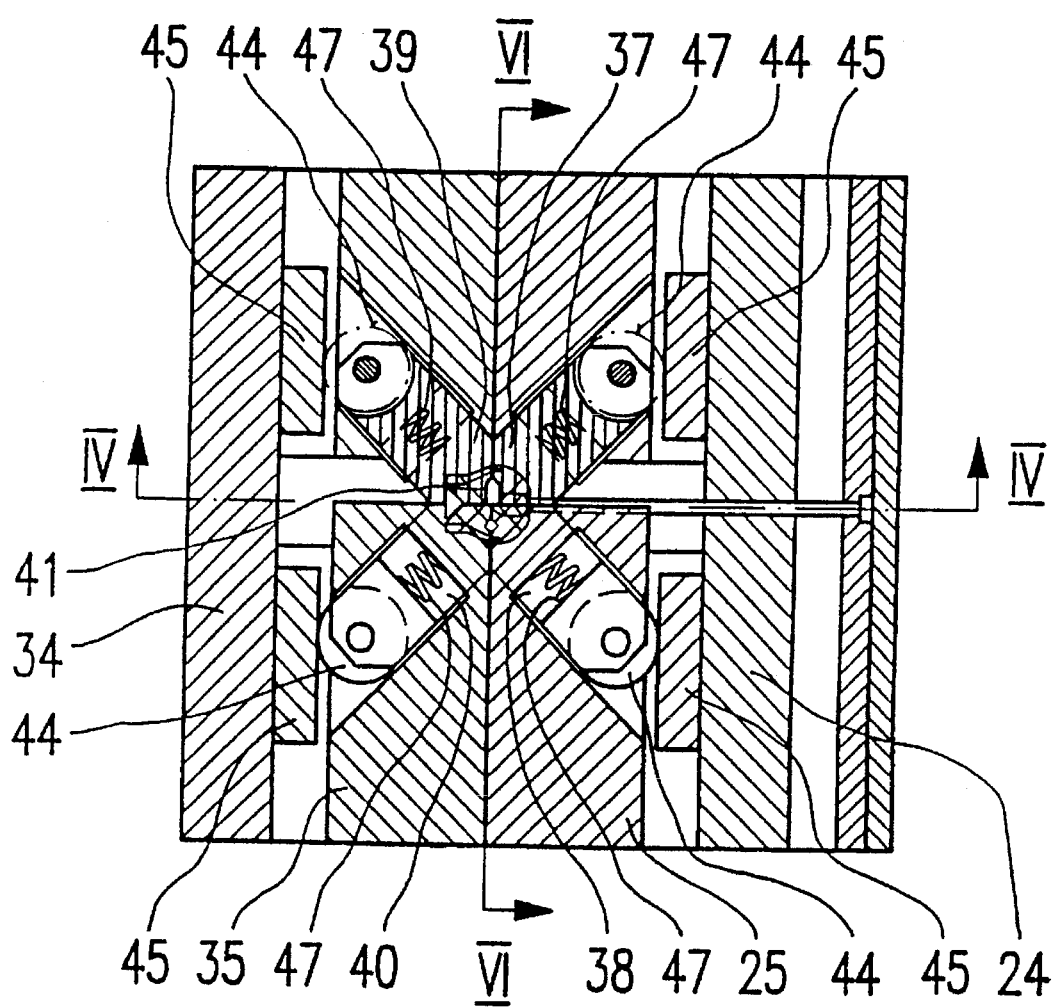
FIG. 5: a cross-section through the tool according to lines V or Va.
Figure 6:
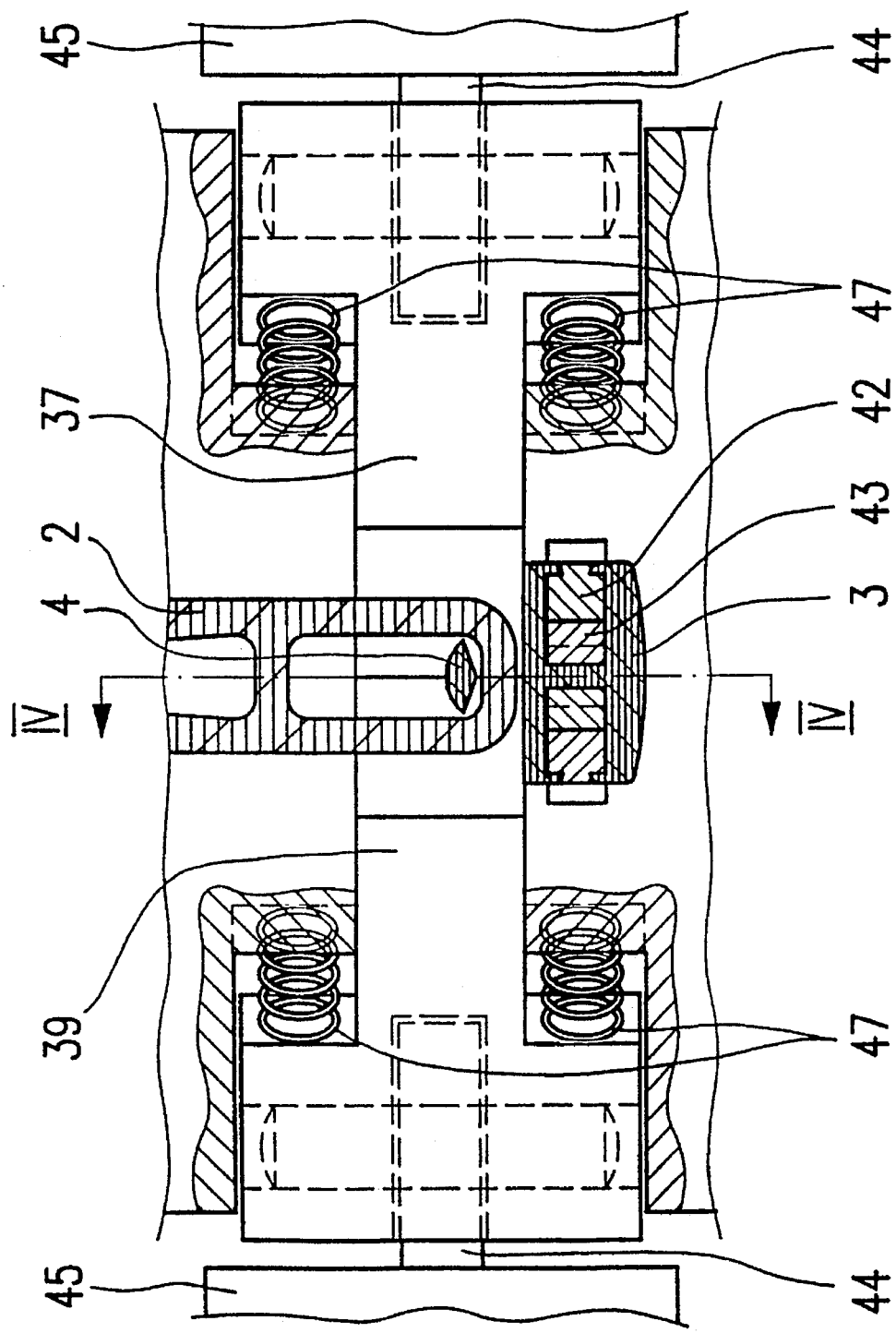
FIG. 6: a detail of a cross-section along line VI.

The matrices 25 or 35 have, in a substantially known way, the casting moulds for the zip fastener slide body and the pull tab. According to the invention, four additional mould cores 37–40 are longitudinally displaceably disposed in the two matrices 25 and 35. The cross-section in FIG. 5 shows that the mould cores 37 to 40 are disposed approximately after the fashion of a cross. They can move along the arms of the cross and, during the injection procedure, are pushed together towards the centre of the cross, their end faces being in contact with one another, and completing the mould for the zipper slide 1. In particular, they form the mould for the web 41 of the pull tab 1, which passes through the eye formed between bow 4 and upper plate 5. The mould cores 37 and 38 in addition form part of the mould for the forward half of the bow 4, in particular for the surface facing the abovementioned eye. Accordingly, the mould cores 39 to 40 form the mould for the surface of the rearward half of bow 4 facing the eye. As FIG. 6 shows, the mould produced in the matrices 25 and 35 is subdivided by the mould cores 37 and 40 into two entirely separate moulds for the slide body 3 and the pull tab 2. Both parts can thus be injection-moulded at the same moment.

By means of appropriate shaping of the underside of the mould cores 37 to 40, the recess 17 may also be formed, which expands in a conical fashion towards the periphery of the upper plate 5, because of the direction of movement of the mould cores. In addition, the mould cores can have, on the underside, projections which form the slot 12 between the wedge-shaped portion 11 and the upper base plate 5. The locking cam 10, integrally moulded on portion 11, is formed by a recess in one of the projections 43 and/or 42 of the matrices 25 or 35, fashioning the interior space of the slide body 3.

The mould cores 37 to 40 have on their rearward end respectively a roller 44, each of which is pushed away by a pressure spring 47, outwards in each case, i.e. away from the centre of the cross, so that the rollers 44 are pressed against the pressure pads 45 on the actuating plates 24 or 25.

The function of the tool will now be described in terms of the opening after injection, with reference to FIG. 5. Firstly the actuating plates 34 and 24 are moved away from the respective matrices 25. Thus the mould cores 37 to 40, under the effect of the pressure of the respective springs 47, shift out of the mould interior of the matrices 25 and 35. This procedure terminates when the respective claws 26 of the actuating plates 24 and 34 abut against the projections 27 on the respective matrix 25 or 35. The mould cores 37 to 40 are then moved apart until the tool can be opened. In this respect, for example, the actuating plate 24 in FIG. 5 may be moved further to the right, the matrix 25 being carried along with it, and the ejectors 29, 30 and 31 can eject the finished zipper slide together with pull tab out of the matrix.

Figure 7:
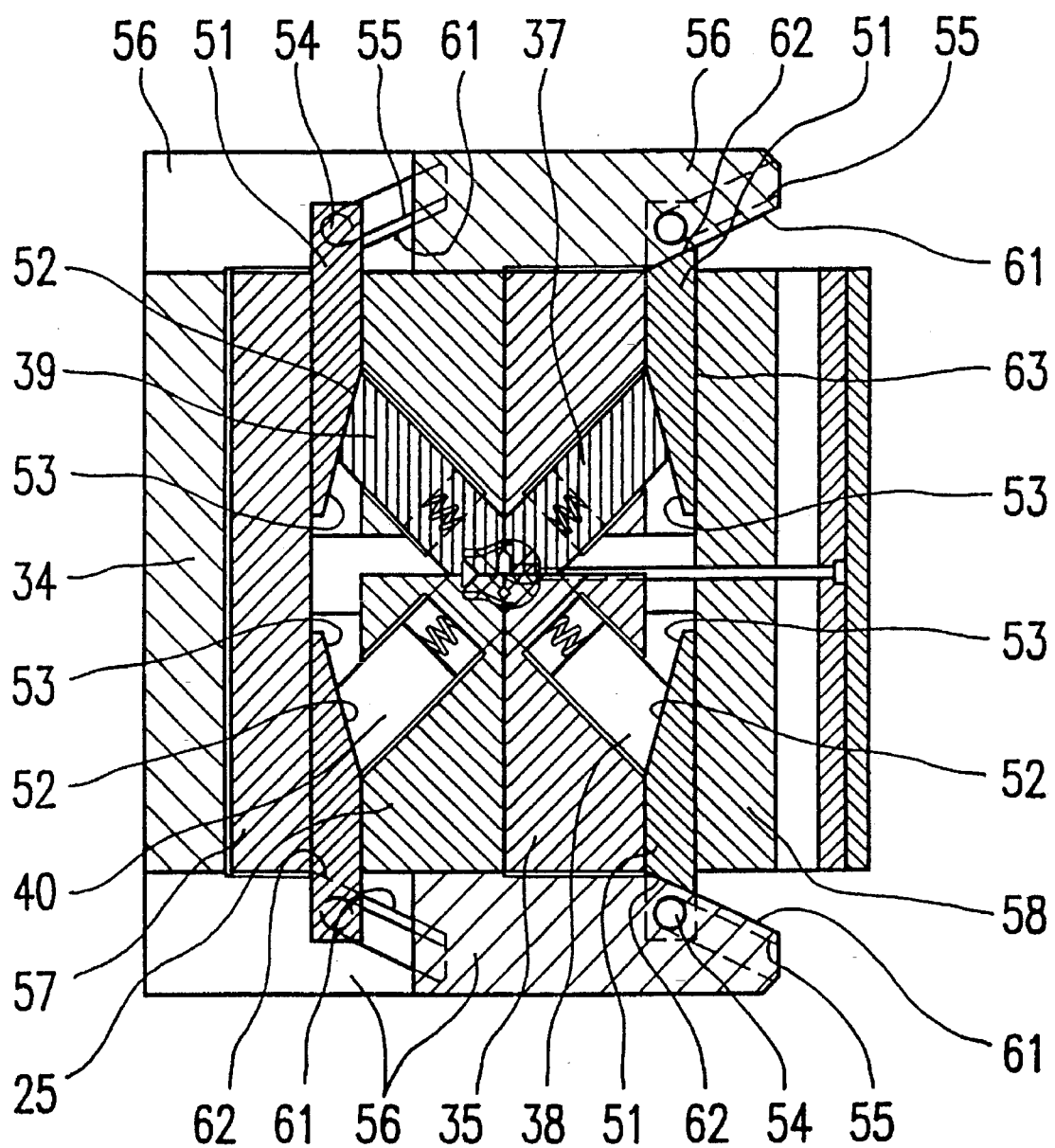
FIG. 7: a cross-section analogous to that in FIG. 4, through another embodiment of the tool.

FIG. 7 shows a variant of the tool. The illustration is analogous to that in FIG. 5, and uses the same reference numerals, where not otherwise indicated. The pressure pieces 45 are substantially replaced by the wedges 51, which can move in the intermediate space between the guide plates 57 and 58 and the matrices 25 or 35. The guide plates 57 and 58 are attached at a fixed spacing from the associated matrix 25 or 35, so that highly precise guidance of the wedges 51 results.

Instead of rollers 44, the mould cores 37 to 40 have slide faces 52, by means of which they can slide with low friction over the ramps 53 of the wedges 51. The wedges 51 carry on their respective outer ends a pin 54 which engages in a groove 55 in a control piece 56. The control pieces 56 are attached to the matrix 35 or to the actuating plate 34. In addition, the wedges 51 are pushed in at precisely defined positions over highly precise slide tracks 61, which operate in conjunction with corresponding ramps 62 on the wedges 51. If during opening of the mould the actuating plates 24 move away from the matrices 25 or 35, the pins 54, and consequently the wedges 51 also, slide outwards, and the mould cores 37 to 40 can move out of the mould.

Figure 8:
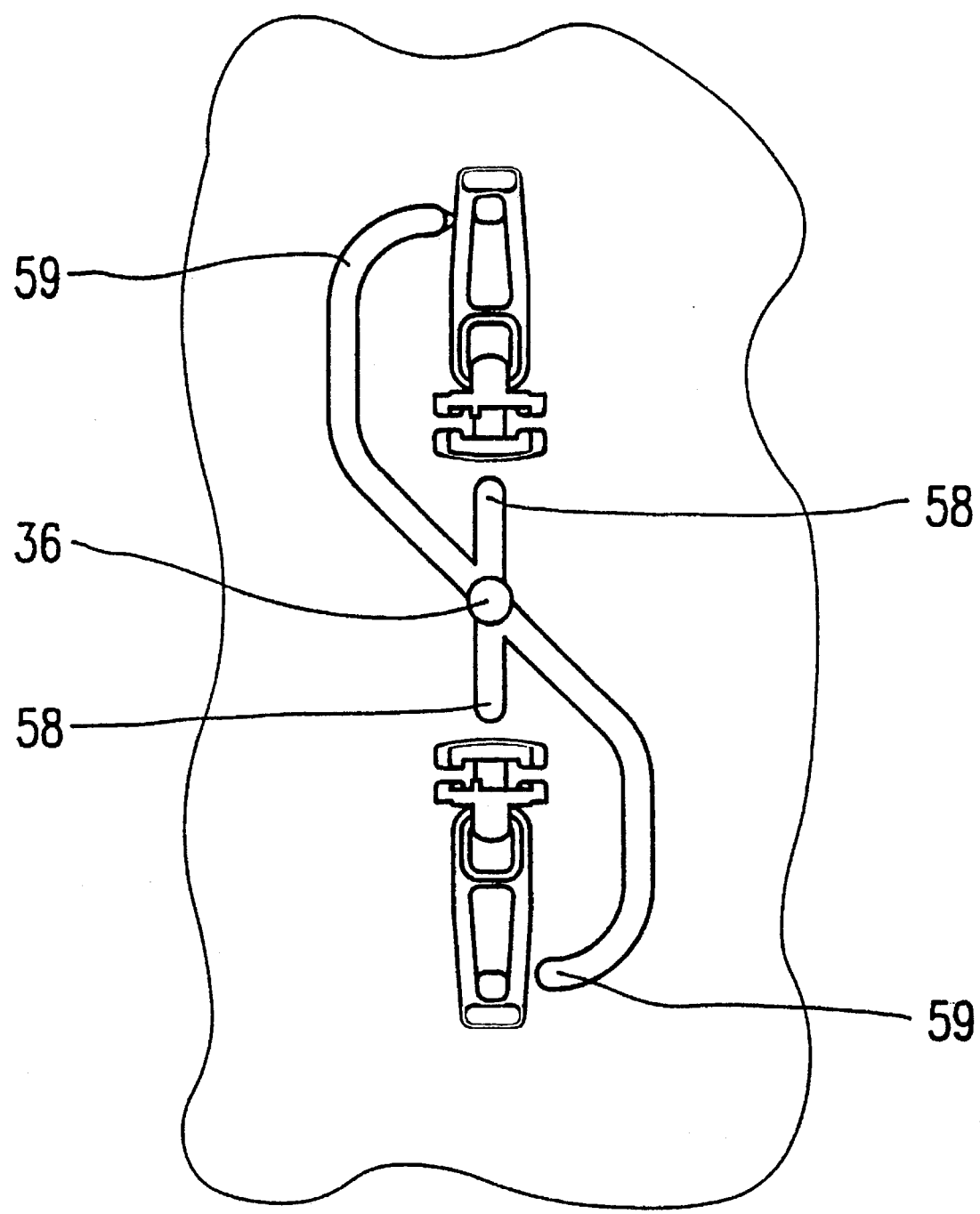
FIG. 8: a diagrammatic plan view of one half of the tool, in accordance with section line VI, with the injection ducts.

FIG. 8 shows a partial plan view of the matrix 25 of the forward tool 21, with a preferred embodiment of the duct 36. It may be seen in particular that one duct 59 is necessary for the material for injection-moulding the pull tab, as well as a further duct 58 for the material for injection-moulding the body 3.

Modifications of the invention may be envisaged within the scope of the inventive idea. For example, a combination would be possible of wedges 51 with rollers 44 instead of slide ramps 53 on the mould cores 37 to 40. Also, embodiments of the slide 1 may be manufactured which are different from the preferred embodiment shown. In particular, neither the recess 15 nor the movable portion 11 with locking cams 10, nor the "wing-lock" structure need be designed. A construction with two pull tabs, each if necessary with locking device, may be imagined. Instead of being set up for two slides, the tool can be designed for only one, or for a larger number of slides.

It may also be envisaged, contrary to the function of the mould cores described, to have the mould cores inserted into the mould under the action of pressure springs, and to withdraw the mould cores from the mould in a controlled manner. Instead of pressure springs 47, pneumatic or hydraulic propulsive elements may also be used. In order to reinforce opening of the tool, or in order to provide a tight closure, additional pressure springs may be disposed respectively between the actuating plate and the matrix of both halves of the tool.

I claim:

1. A lockable slider for a slide fastener having a pair of coupling elements along respective slide-fastener halves interconnectable upon movement of the slider along the coupling elements in a fastener-closing direction and adapted to disengage the coupling elements upon movement of the slider in an opposite fastener-opening direction, said slider comprising:
   a slider body having an upper plate and a lower plate, each having first and second ends, and a separating wedge connecting said first ends of said upper and lower plates and forming therewith a pair of guide channels for the respective coupling elements merging at a narrow mouth of the slider body remote from said separating wedge;
   a resiliently deflectable bow member surmounting said upper plate and extending in a longitudinal direction of said slider from said first end to said second end of said upper plate, said bow member having first and second ends, said first end of said bow member being anchored to said body at said first end of said upper plate, and said second end of said bow member terminating at said mouth;
   a pull tab movably secured within an eye formed between said upper plate and said bow member;
   a locking cam connected with and forming an extension of said second end of said bow member and projectable into said guide channels at said mouth for engagement with said coupling elements to lock the slider thereto, said cam being withdrawable from engagement with the coupling elements upon deflection of said second end of said bow member away from said body;
   a first stop portion formed on said second end of said upper plate; and
   a second stop portion formed on said second end of said bow member and disposed in spaced relation with said first stop portion of said upper plate when said bow member is in a relaxed condition and engageable with said first stop portion to limit deflection of said bow member away from said body;
   said first stop portion and said second stop portion each having surface cross sections uniform along an axis oriented at an angle with respect to said longitudinal direction of said slider, whereby said slider body, said bow member, said pull tab, said locking cam, said first stop portion, and said second stop portion may be unitarily molded from plastic material.

2. A lockable slider as claimed in claim 1, wherein said first and second stop portions are interengageable steps.

3. A lockable slider as claimed in claim 1, wherein said first and second stop portions each have two sections, one on each side of a centerline in said longitudinal direction.

4. A lockable slider as claimed in claim 3, wherein said two sections form a "V" in the plane of said upper plate.

5. A lockable slider as claimed in claim 1, wherein there are, on the upper and lower plates, lateral guides for said coupling elements of the slide fastener, the ends of the lateral guides being shaped to be angled or bent towards said separating wedge, in order to prevent an involuntary movement of the slider by hooking these ends into said coupling elements of the slide fastener.

6. A lockable slider as claimed in claim 1, wherein said slider body, said bow member, said pull tab, said locking cam, said first stop portion, and said second stop portion are unitarily molded from plastic material.

7. A slide fastener comprising:
   a lockable slider; and
   a pair of coupling elements along respective slide-fastener halves interconnectable upon movement of the slider along the coupling elements in a fastener-closing direction and adapted to disengage the coupling elements upon movement of the slider in an opposite fastener-opening direction;
   said slider comprising:
      a slider body having an upper plate and a lower plate, each having first and second ends, and a separating wedge connecting said first ends of said upper and lower plates and forming therewith a pair of guide channels for the respective coupling elements merging at a narrow mouth of the slider body remote from said separating wedge;
      a resiliently deflectable bow member surmounting said upper plate and extending in a longitudinal direction of said slider from said first end to said second end of said upper plate, said bow member having first and second ends, said first end of said bow member being anchored to said body at said first end of said upper plate, and said second end of said bow member terminating at said mouth;
      a pull tab movably secured within an eye formed between said upper plate and said bow member;
      a locking cam connected with and forming an extension of said second end of said bow member and projectable into said guide channels at said mouth for engagement with said coupling elements to lock the slider thereto, said cam being withdrawable from engagement with the coupling elements upon deflection of said second end of said bow member away from said body;
      a first stop portion formed on said second end of said upper plate; and
      a second stop portion formed on said second end of said bow member and disposed in spaced relation with said first stop portion of said upper plate when said bow member is in a relaxed condition and engageable with said first stop portion to limit deflection of said bow member away from said body;
      said first stop portion and said second stop portion each having surface cross sections uniform along an axis oriented at an angle with respect to said longitudinal direction of said slider, whereby said slider body, said bow member, said pull tab, said locking cam, said first stop portion, and said second stop portion may be unitarily molded from plastic material.

8. A slide fastener as claimed in claim 7, wherein said first and second stop portions are interengageable steps.

9. A slide fastener as claimed in claim 7, wherein said first and second stop portions each have two sections, one on each side of a centerline in said longitudinal direction.

10. A slide fastener as claimed in claim 9, wherein said two sections form a "V" in the plane of said upper plate.

11. A slide fastener as claimed in claim 7, wherein there are, on the upper and lower plates, lateral guides for said coupling elements of the slide fastener, the ends of the lateral guides being shaped to be angled or bent towards said separating wedge, in order to prevent an involuntary movement of the slider by hooking these ends into said coupling elements of the slide fastener.

12. A slide fastener as claimed in claim 7, wherein said slider body, said bow member, said pull tab, said locking cam, said first stop portion, and said second stop portion are unitarily molded from plastic material.

* * * * *